(12) United States Patent
Kim

(10) Patent No.: US 6,371,549 B2
(45) Date of Patent: Apr. 16, 2002

(54) TAILGATE PULL HANDLE OF AUTOMOBILE

(75) Inventor: Yong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/733,796

(22) Filed: Dec. 5, 2000

(30) Foreign Application Priority Data

Dec. 29, 1999 (KR) .............................. 99-64672
Dec. 29, 1999 (KR) .............................. 99-64673
Dec. 29, 1999 (KR) .............................. 99-64675

(51) Int. Cl.[7] ................................. B60J 5/10
(52) U.S. Cl. .................. 296/146.8; 296/146.9
(58) Field of Search .................. 296/146.8, 146.9, 296/56, 146.1, 106; 16/115

(56) References Cited

U.S. PATENT DOCUMENTS 5,588,692 A * 12/1996 Gandhi et al.
5,868,455 A * 2/1999 Springer et al.
6,180,212 B1 * 1/2001 Single et al.

* cited by examiner

*Primary Examiner*—Joseph D. Pape
*Assistant Examiner*—Scott Carpenter
(74) *Attorney, Agent, or Firm*—Christie, Parker & Hale, LLP

(57) ABSTRACT

A tailgate pull handle of automobile adapted to lower a pull handle formed at a tailgate when the tailgate is opened, thereby allowing a short person to have an easy access to the pull handle for closing same, the pull handle comprising an actuating device mounted at an inner lower side or a lower end of the tailgate for moving same toward the ground when the tailgate is opened.

7 Claims, 6 Drawing Sheets

TAILGATE PULL HANDLE OF AUTOMOBILE

BACKGROUND OF THE INVENTION

1. Field of the Invention

The present invention relates to a pull handle mounted on a tailgate of on automobile, and more particularly to a tailgate pull handle of an automobile adapted for a short person's easier use in holding the pull handle to close the tailgate.

2. Description of the Prior Art

Generally, an automobile in equipped with openable and closeable doors for loading and unloading and particularly a one-box car such as jeep, van, five-door vehicle and the like is arranged with a tailgate for loading and unloading cargoes, luggage and the like. A tailgate 50 is rotably mounted via a hinge 51 to an upper end of roof panel (R) which is a rear side of a body (B) as illustrated in FIG. 8, and when the tailgate 50 is opened and closed, luggage can be loaded into or unloaded through the rear side of the automobile.

At this time, the tailgate 50 is mounted at an inner side thereof with a pull handle 52 for closing the tailgate 50, and in other words, as illustrated in FIG. 9, a recessed pull handle 52 is formed at a trim panel 54 fixedly provided at an inner side of a tailgate inner panel 53.

When the tailgate 50 is opened, it rises relatively high up, such that the recessed pull handle 52 is formed at a lower part of the tailgate trim panel 54 in order to close the tailgate 50.

However, there is a problem in that recessed pull handle thus formed at the tailgate trim panel in that it is difficult for a relatively short person to hold the pull handle and to pull the tailgate, resulting in inconvenience in closing the tailgate. In other words, the pull handle positioned high at the opened tailgate provides no convenience to a relatively short person in holding same and closing the tailgate.

SUMMARY OF THE INVENTION

The present invention is disclosed to solve the aforementioned problem and it is an object of the present invention to provide a tailgate pull handle of automobile adapted to lower a pull handle formed at a tailgate when the tailgate is opened, thereby allowing a short person to have an easy access to the pull handle for closing same.

In accordance with the object of the present invention, there is provided a tailgate pull handle of an automobile, the pull handle comprising:

a handle coupled to hinge means at an inner lower side of a trim panel and protruded at one side thereof into the trim panel;

a slider formed with a hitching groove for interlocking with an inner lateral end of the trim panel at the handle and supported by guide means for elevation;

resilient means for applying resilience to lower the slider; and a piston coupled to a lower end of the slider and protruded to a lower surface of the trim panel for contact with a body.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

The tailgate pull handle according to the present invention includes a handle 3A coupled to hinge means at an inner lower side of a trim panel 54 and protruded at one side thereof into the trim panel 54, a slider 5 formed with a hitching groove 4 for interlocking with an inner lateral end of the trim panel 54 at the handle 3A and supported by guide means for elevation, resilient means for applying resilience to lower the slider 5, and a piston 6 coupled to a lower end of the slider 5 and protruded to a lower surface of the trim panel 54 for contact with a body (B).

Figure 1:
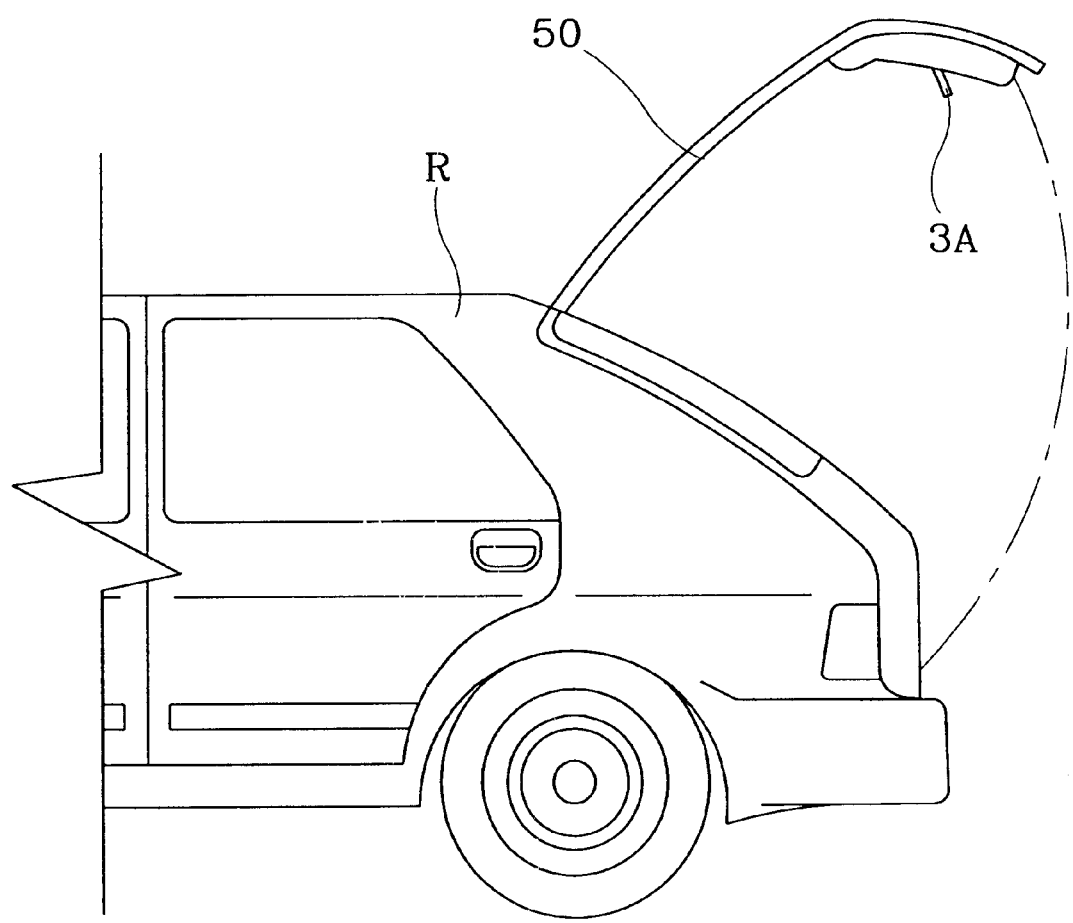
FIG. 1 is a schematic lateral view for illustrating a rear part of automobile to show an opened tailgate applied with a first embodiment of a pull handle according to the present invention.
Figure 2:
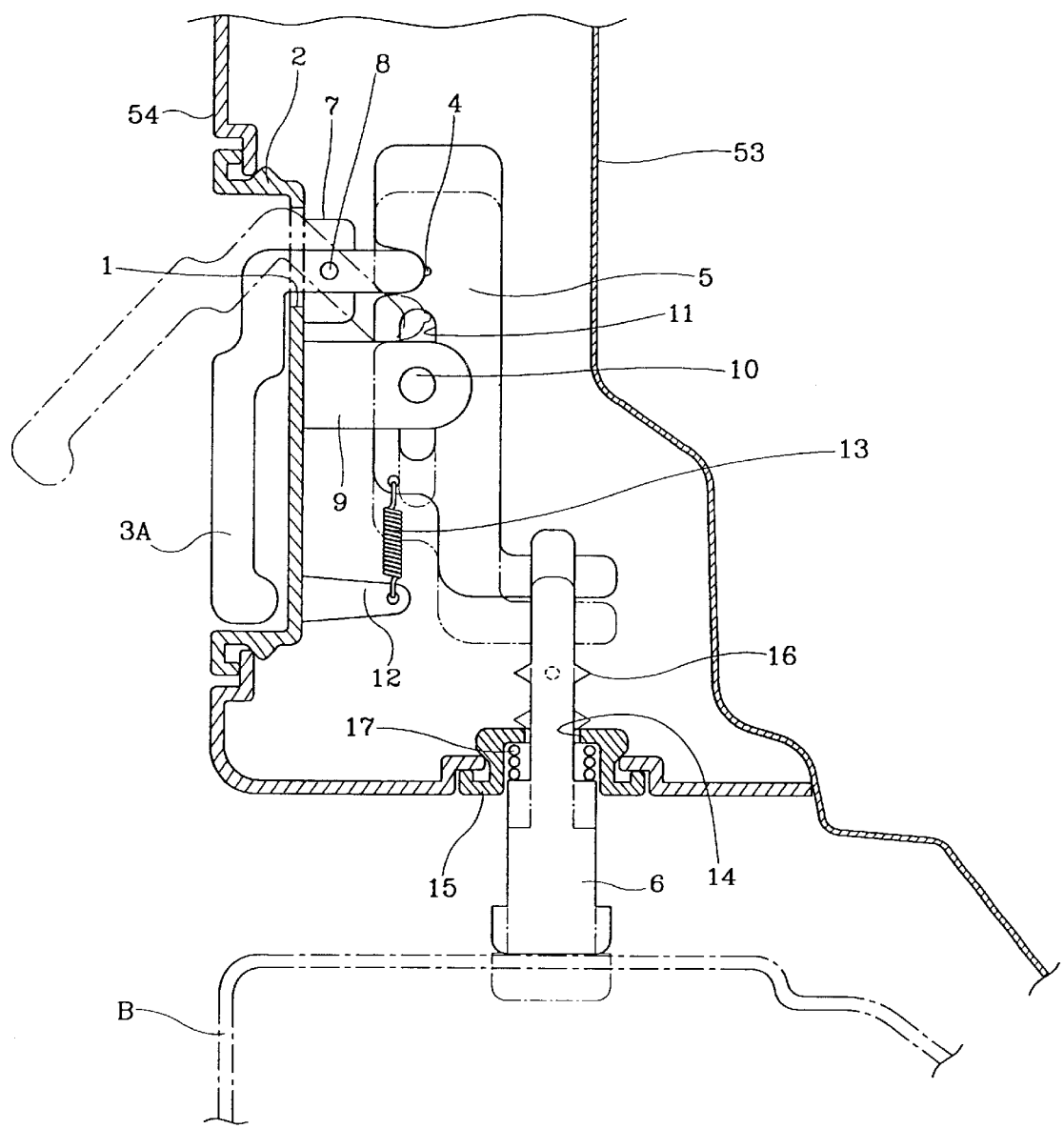
FIG. 2 is a sectional view for illustrating a partially enlarged tailgate mounted with a pull handle of FIG. 1.

The pull handle according to a first embodiment of the present invention includes, as illustrated in FIGS. 1 and 2, a first bezel 2 coupled to a lower inner side of a trim panel 54 and formed with a first through hole 1, a handle 3a coupled via hinge means for rotation while one end thereof pierces the first through hole 1 to protrude into the trim panel 54, a slider 5 formed with a hitching groove 4 for interlocking with an inner end of the trim panel 54 at the handle 3A and supported by guide means for elevation, resilient means for applying resilience for the slider 5 to descend, and a piston 6 coupled to a lower end of the slider 5 and protruded into a lower surface of the trim panel 54 for elevation.

The hinge means is composed of a bracket 7 mounted at a lateral surface of the first through hole 1 at the first bezel 2 and a rotary axle 8 installed through the bracket 7 and coupled to the handle 3A for allowing the handle 3A to rotate.

The guide means is installed with a guide bracket 9 protrusively formed at the first bezel 2, a guide axle 10 mounted at the guide bracket 9 and a guide slot 11 vertically and rectangularly formed at the slider 5 for the guide axle 10 to get inserted thereinto.

The resilient means is arranged with a fixation bracket 12 protrusively formed at the first bezel 2, and a first spring 13 coupled at one end thereof to the slider 5 while fixed at the other end thereof to the fixation bracket 12 for applying resilience for the slider 5 to descend.

Particularly, the piston 6 is coupled to the trim panel 54 to pierce a second through hole 14 of a second bezel 15, and is provided with stopping means between the piston 6 and the second bezel 15 for controlling a protruded height and accommodated degree of the piston 6.

The stopping means is protrusively formed in two prongs from the piston 6 to get hitched at the second through hole 14. In other words the stopping means is formed with hitching protruders 16 by which the piston 6 can protrude at a predetermined height.

Figure 3:
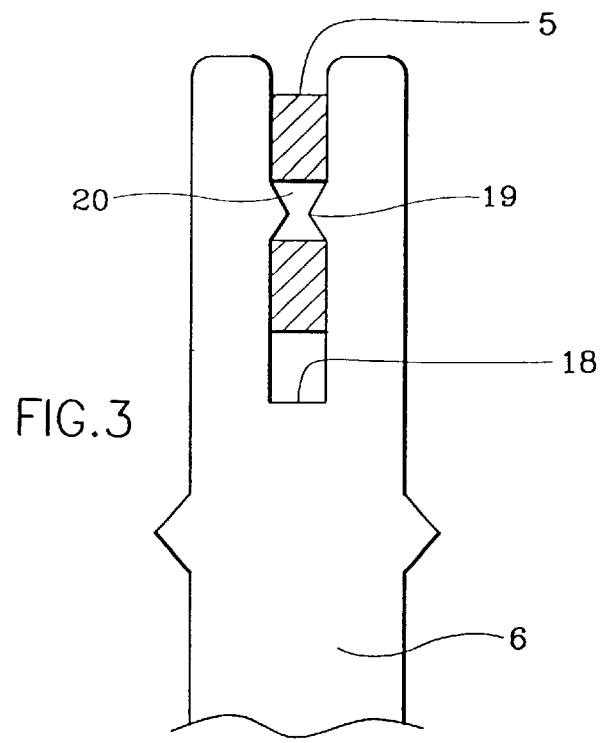
FIG. 3 is a sectional view for illustrating a connected state of a slider and a piston of FIG. 2.

Furthermore, between the second bezel 15 and the piston 6, there is disposed a second spring 17 to apply resilience to the piston 6 when the piston 6 descends, thereby making it easy for the slider 5 to go down. The piston 6 and the slider 5 include, as illustrated in FIG. 3, a cut part 18 formed at an upper end thereof, a protruder 19 formed at a predetermined height oppositely from an inner surface of the cut part 18 and a hitching slot 20 formed at a longitudinal end of the slider 5 for the protruder 19 to be inserted thereinto, such that it is easy to fit the slider 5 and the piston 6.

When the tailgate 50 is opened under this construction, the tailgate 50 is opened against the body (B) at a right angle or more, such that the piston 6 is protrusively descended by the resilience of the first and second spring 13 and 17 because there is no part (body) to restrain the piston 6 when the tailgate 50 is opened.

When the piston 6 is protruded downward, the slider 5 connected to the hitching slot 20 and the protruder 19 is in turn lowered, where the handle (3A) interlocked through the hitching groove 4 is rotated to a dotted position in the drawing simultaneously with the lowering slider 5.

When the handle (3A) is rotated to the dotted position, the handle (3A) actually becomes positioned at a lower height than that of the tailgate 50.

When the handle (3A) gets lower in height than that of the tailgate 50, it becomes easier for a relatively short person to shut the tailgate 50 when he or she holds the handle (3A) to close the tailgate 50.

When the handle (3A) is pulled to close the tailgate 50 under this condition, the piston 6 is pressed by the body (B) to lift the slider 5, whereby the handle (3A) is rotated to the trim panel direction to be accommodated into the first bezel 2.

As mentioned above, the pull handle 52 according to the prior art is formed at the inner trim panel 54 of the tailgate 50, such that in order to close the tailgate 50, a person should be taller than the opened height of the tailgate 50. However, the handle (3A) according to the first embodiment is positioned below the tailgate 50 such that even a shorter person can easily close the tailgate 50.

Figure 4:
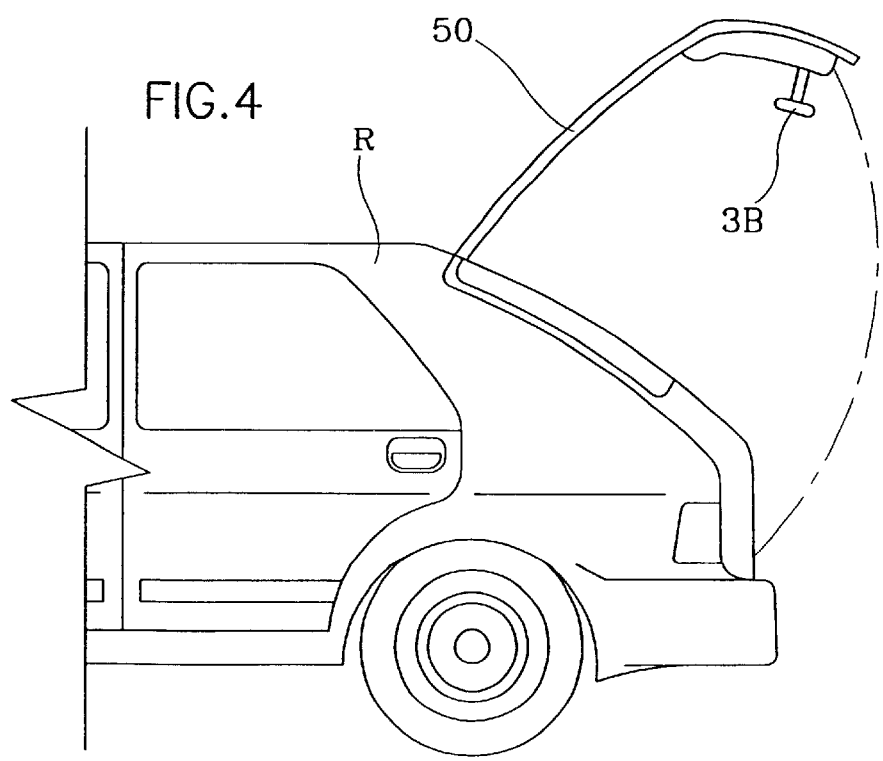
FIG. 4 is a schematic lateral view for illustrating a rear part of automobile where a tailgate is opened in application of a second embodiment of a pull handle according to the present invention.
Figure 5:
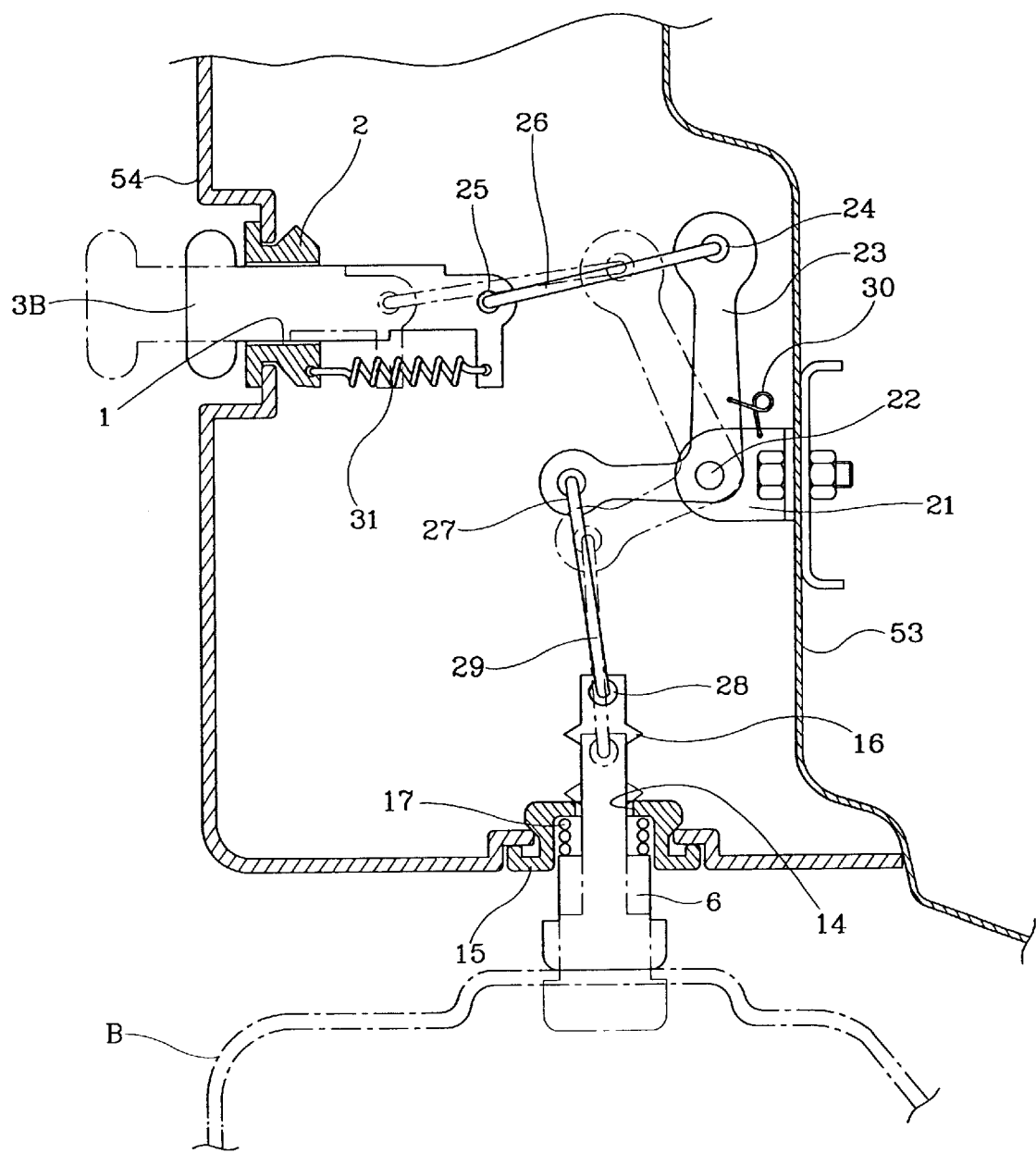
FIG. 5 is a sectional view for illustrating a partially enlarged tailgate mounted with the pull handle of FIG. 4.

Now, a second embodiment of the present invention will be described with reference to FIGS. 4 and 5, where a tailgate pull handle of an automobile comprises a first bezel 2 coupled at a lower inner side of the trim panel 54 and formed with a first through hole 1, a handle (3B) for piercing the first through hole 1 for sliding motion, a piston 6 for cooperatively moving along the handle (3B) and for going up and down through a second through hole 14 at a second bezel 15 coupled to a lower side of the trim panel 54, link means for transmitting a horizontal movement of the handle (3B) to the piston 6 for elevation and resilient means for applying resilience such that the handle (3B) can be protruded to the trim panel 54.

The link means includes a bracket 21 installed at an inner panel 53 of the tailgate 50, a first link 23 rotably mounted at the bracket 21 via a first rotary axle 22 and formed in "L" shape, a second link 26 connected at one end thereof to the first link 23 via a second rotary axle 24 and connected at the other end thereof to a longitudinal end of the handle (3B) through a third rotary axle 25, and a third link 29 connected to the other end of the first link 23 via a fourth rotary axle 27 and connected to an upper end of the piston 6 via a fifth rotary axle 28.

Furthermore, between the bracket 21 and the first link 23 there is mounted a spring 30 to allow the first link 23 to rotate clockwise.

The resilient means is a first spring 31 coupled at one end thereof to the first bezel 2 and coupled at the other end thereof to a longitudinal end of the handle (3B) to pull the handle (3B) to the trim panel 54 direction, where, between the second bezel 15 and the piston 6, there is installed a second spring 7 for applying resilience to the piston 6 in its protrusion.

Now, operational effect of the second embodiment thus constructed will be described.

When the tailgate 50 is closed, the piston 6 is pressed to the body (B) and while the piston 6 is lifted, the first, second and third links 23, 26 and 29 connected to the piston 6 are rotated to cause the handle (3B) to move to the right on the drawing.

When the tailgate 50 is opened, the part (body) which has pressed the piston 6 is removed to protrude the piston 6 downward according to the resilience of the springs 30, 31 and 17. When the piston 6 is protruded, the first link 23 connected to the third link 29 thereby is rotated counter-clockwise about the first rotary axle 22 while the second link 26 connected to the first link 23 via the second rotary axle 24 is moved to the left on the drawing.

When the second link 26 is moved to the left, the handle (3B) connected to the second link 26 via the third rotary axle 25 is moved to the left to protrude from the trim panel 54 at a predetermined distance.

When the handle (3B) is distanced from the trim panel 54, the tailgate 50 is vertically opened and the handle (3B) is protruded downward to allow the tailgate 50 to be positioned at a height graspable by a user.

In other words, when the tailgate 50 is opened, it is opened upto a vertical level, where the handle (3B) is protruded from a trim panel part (a lower part) of the tailgate 50, such that the tailgate 50 is actually lowered in height thereof for the user to easily hold the handle (3B) and close the tailgate 50. When the tailgate 50 is closed, the piston 6 is again pressed by the body (B) to go up and to return to an initial state.

As mentioned in the second embodiment of the present invention, the handle (3B) is made to be positioned below the tailgate 50 to allow a short person to easily close the tailgate 50.

Figure 6:
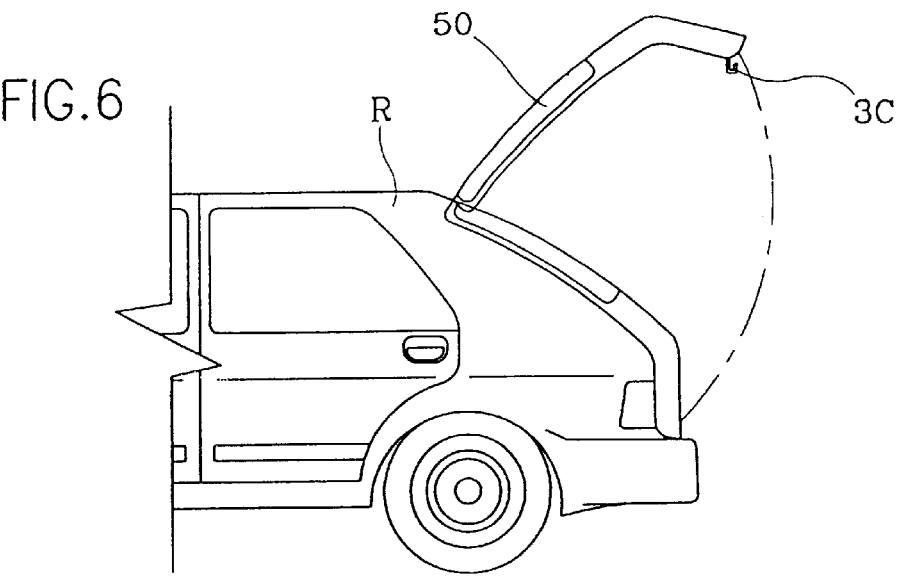
FIG. 6 is a schematic lateral view for illustrating a rear part of automobile where a tailgate is opened in application of a third embodiment of a pull handle according to the present invention.

Now, a third embodiment of the present invention will be described in detail with reference to FIGS. 6 and 7, where the tailgate pull handle of an automobile includes a through hole 32 formed underneath the trim panel 54 of the tailgate and for creating a gap at a tailgate inner panel 53, a bracket 33 mounted inside the through hole 32 and fixed to the inner panel 53, a handle (3C) coupled to the bracket 33 via a rotary axle 34 and protruded through the through hole 32, a spring 35 installed between the bracket 33 and the handle (3C) in order to apply resilience to a direction where the handle (3C)

is distanced from the inner panel 53, and a recess 36 formed at the inner panel 53 to receive the handle (3C) when the tailgate 50 is closed.

In other words, when the tailgate 50 is opened, the spring 35 causes the handle (3C) to widen, where the handle (3C) is positioned to a place lower than the tailgate 50, such that a user can holds the handle (3C) to close the tailgate 50. The recess 36 is so constructed as to receive the handle (3C) where the handle (3C) is not interfered by the body (B) and the tailgate 50 when the tailgate 50 is closed.

Now, operational effect of the third embodiment of the present invention thus constructed will be described.

When the tailgate 50 is closed, the handle (3C) is placed between the body (B) and the recess 36 of the tailgate 50, where the handle (3C) is rotated about the rotary axle 34 to of be folded.

Figure 7:
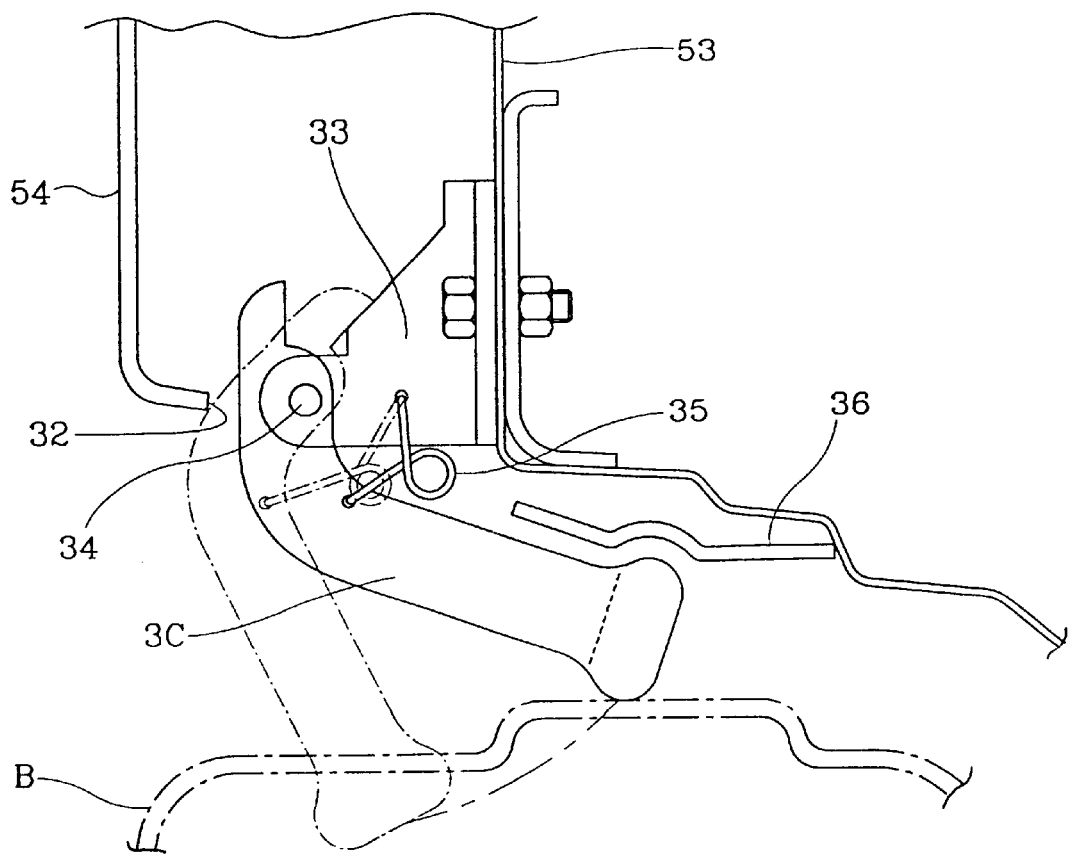
FIG. 7 is a sectional view for illustrating a partially enlarged tailgate where the pull handle of FIG. 6 is mounted.
Figure 8:
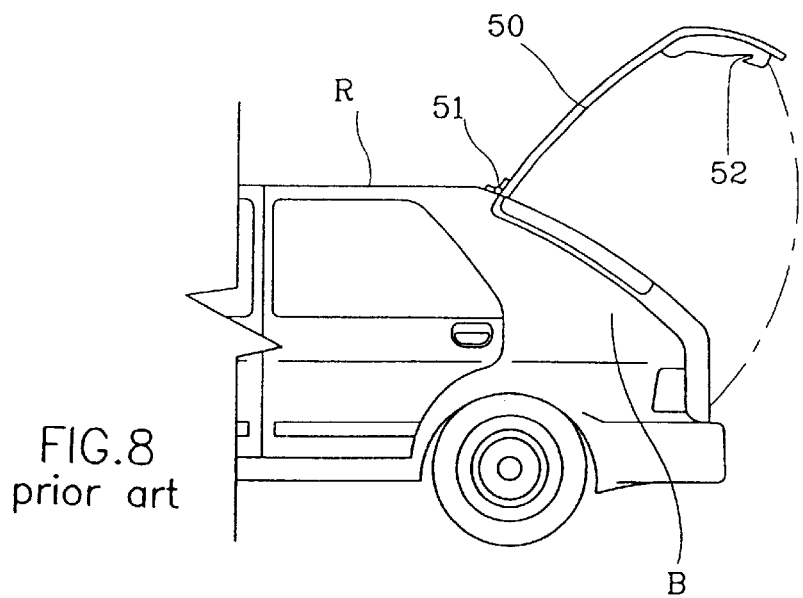
FIG. 8 is a schematic view for illustrating a mounted state of pull handle at a tailgate according to the prior art.
Figure 9:
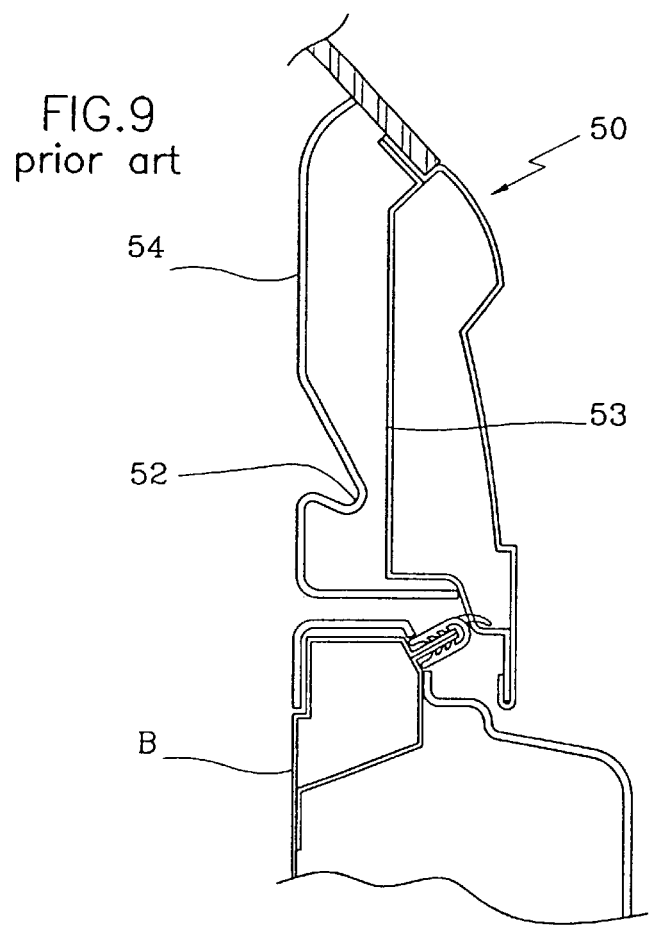
FIG. 9 is a sectional view for illustrating a partially enlarged pull handle according to the prior art of FIG. 8.

Under this state, when a user opens the tailgate 50, the tailgate 50 is opened at beyond the right angle against the body (B), and the handle (3C) is widened by the resilience of the spring 35 as per the dotted line in FIG. 7.

When the handle (3C) is widened from the tailgate 50, the handle (3C) becomes lower than the tailgate 50. When the handle (3C) is positioned at a lower lever than that of the tailgate 50, a relatively short person can hold and pull the handle (3C) for closing the tailgate 50, making it a lot easier for the use to close the tailgate 50. In other words, the handle (3C) according to the third embodiment of the present invention is situated at a height lower than that of the tailgate 50 allowing a relatively short person to easily close the tailgate.

As apparent from the foregoing, there is an advantage in the tailgate pull handle of an automobile according to the present invention in that a handle is made to position at a lower height than a tailgate such that a relatively short person can easily close the tailgate.

What is claimed is:

1. A tailgate pull handle of an automobile, the pull handle comprising:

a handle coupled to hinge means at an inner lower side of a trim panel and protruded at one side thereof into the trim panel;

a slider formed with a hitching groove for interlocking with an inner lateral end of the trim panel at the handle and supported by guide means for elevation;

resilient means for applying resilience to lower the slider; and a piston coupled to a lower end of the slider and protruded to a lower surface of the trim panel for contact with a body.

2. The pull handle as defined in claim 1, wherein the hinge means comprises:

a bracket mounted at a lateral surface of the first through hole at the first bezel; and a rotary axle installed through the bracket and coupled to the handle for allowing the handle to rotate.

3. The pull handle as defined in claim 1 or 2, wherein the guide means comprises:

a guide bracket protrusively formed at the first bezel;

a guide axle mounted at the guide bracket; and a guide slot vertically and rectangularly formed at the slider for the guide axle to get inserted thereinto.

4. The pull handle as defined in claim 1 or 2, wherein the resilient means comprises:

a fixation bracket protrusively formed at the first bezel;

a first spring coupled at one end thereof to the slider while fixed at the other end thereof to the fixation bracket for applying resilience for the slider to descend.

5. The pull handle as defined in claim 1 further comprising stopping means mounted between the piston and the second bezel to restrict a protruded height and recess degree of the piston.

6. The pull handle as defined in claim 5, wherein the stopping means comprises hitching protruders, each protrusively formed at each side of the piston to get hitched at the second through hole and formed at a position where the piston can be protruded at a predetermined height.

7. The pull handle as defined in claim 1 or 2, wherein the piston and the slider comprises:

a cut part formed at an upper end thereof;

a protruder formed at a predetermined height oppositely from an inner surface of the cut part; and a hitching slot formed at a longitudinal end of the slider for the protruder to be inserted thereinto.

* * * * *